United States Patent
Miwa et al.

(10) Patent No.: US 8,117,731 B2
(45) Date of Patent: Feb. 21, 2012

(54) METHOD AND DEVICE FOR INSTALLING DOOR GLASS ON VEHICLE DOOR

(75) Inventors: Hiroshi Miwa, Tochigi (JP); Atsushi Osada, Tochigi (JP); Akira Minegishi, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 922 days.

(21) Appl. No.: 12/092,032

(22) PCT Filed: Nov. 29, 2005

(86) PCT No.: PCT/JP2005/022252
§ 371 (c)(1),
(2), (4) Date: Jun. 13, 2008

(87) PCT Pub. No.: WO2007/063606
PCT Pub. Date: Jun. 7, 2007

(65) Prior Publication Data
US 2009/0241316 A1    Oct. 1, 2009

(51) Int. Cl.
*B23Q 7/00* (2006.01)
*B23P 21/00* (2006.01)

(52) U.S. Cl. .......................................... 29/559; 29/721

(58) Field of Classification Search .................... 29/428, 29/468, 464, 559, 281.1, 281.4, 700, 721, 29/897.2
See application file for complete search history.

(56) References Cited

U.S. PATENT DOCUMENTS 5,379,553 A    1/1995    Kimura et al.

FOREIGN PATENT DOCUMENTS

| DE | 43 43 254 A1 | 6/1994 |
|---|---|---|
| JP | 46-26007 A | 9/1971 |
| JP | S46-26007 B | 9/1971 |
| JP | 5-069865 A | 3/1993 |
| JP | 2743246 B2 | 7/1995 |
| JP | 9-207845 A | 8/1997 |
| JP | 3299316 B2 | 7/2002 |

*Primary Examiner* — John C Hong
(74) *Attorney, Agent, or Firm* — Arent Fox LLP

(57) ABSTRACT

A method of installing a door glass (15) on a vehicle door (16). The door glass is tilted relative to the front-rear direction of a vehicle to reduce the length in the front-rear direction of the door glass. The tilted door glass is lowered to position it between a pair of sashes (121, 122) provided at the front and rear of the vehicle door. The tilt of the door glass is corrected to a predetermined level to fit the door glass into the front and rear sashes and then the door glass is lowered.

2 Claims, 11 Drawing Sheets

FIG. 1
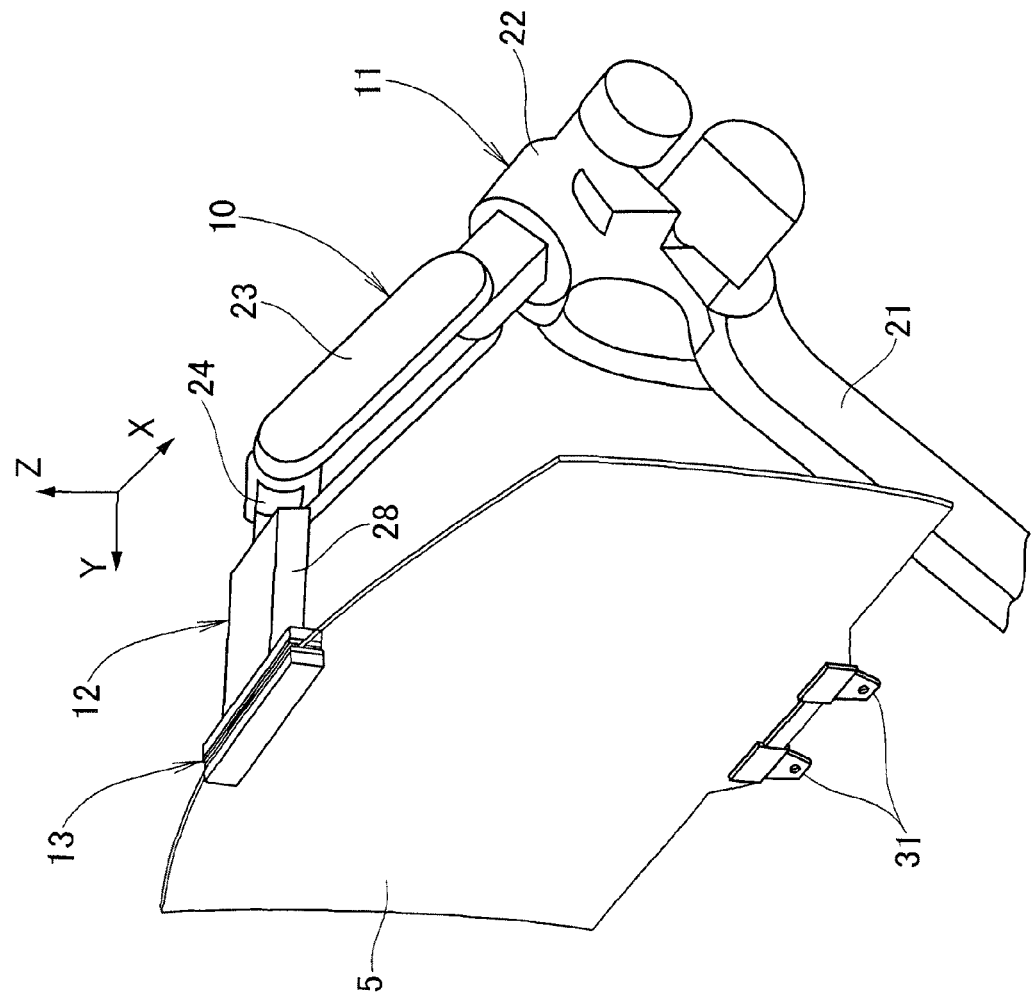
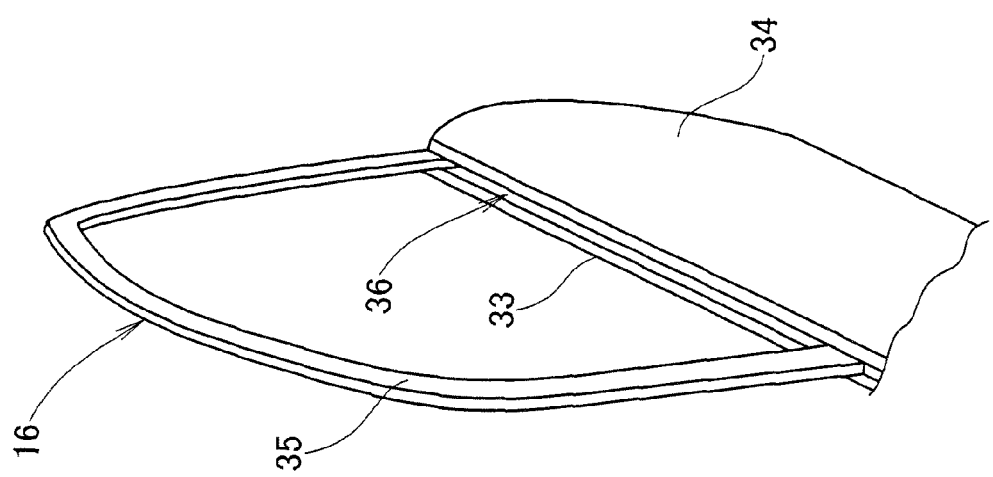

METHOD AND DEVICE FOR INSTALLING DOOR GLASS ON VEHICLE DOOR

CROSS-REFERENCE TO RELATED APPLICATION

This application is a National Stage entry of International Application No. PCT/JP2005/022252, filed Nov. 29, 2005, the entire specification claims and drawings of which are incorporated herewith by reference.

TECHNICAL FIELD

The present invention relates to an improvement in a method and device for installing a door glass in a vehicle door.

BACKGROUND ART

Japanese Patent Application Laid-Open Publication No. 5-69865, for example, discloses a method for mounting a door glass in a vehicle door which comprises an inner panel part and an outer panel part and in which the inner panel is mounted on the outer panel part with the door glass being mounted on the inner panel part in advance. This door glass mounting method will be described with reference to FIGS. 11 and 12 hereof.

FIG. 11 shows a state in which the door glass is being assembled. A vehicle door 200 has an outer panel part 201 and an inner panel part 202.

The outer panel part 201 has an outer door panel 204 that constitutes a lower portion, and a door frame 205 that is installed on an upper part of the outer door panel 204.

The inner panel part 202 is provided with an inner door panel 207. A window regulator 211, a door glass 212, a door lock 213, and a door glass guide 214 are installed in the inner door panel 207 prior to installing the inner panel part 202 on the outer panel part 201.

The window regulator 211 has a main guide 216, a guide slider 215 that is moveably installed inside the main guide 216, a wire 217 that is connected to both ends of the guide slider 215, a drum 218 on which the wire 217 is wound, and a motor 221 for driving the drum 218. A channel 223 is rotatably installed on engagement protrusions 222 disposed on the guide slider 215. A bracket (not shown) disposed on a lower end of the door glass 212 is fastened to the channel 223.

The door glass guide 214 guides one end of the door glass 212. A plurality of installation holes 225 is provided to the outer door panel 204. A plurality of installation holes 226 is provided to the inner door panel 207.

FIG. 12 shows in cross-section the door frame 205 and the door glass 212 of FIG. 11. A door glass run 228 is fitted into the door frame 205. The door glass 212 has a corner piece 231 for movement within the door glass run 228.

The mounting of the inner panel part 202 on the outer panel part 201 will be described briefly below.

First, a machine tool is used to tilt the inner panel part 202, to fit the inner panel part into a notch 233 formed in the outer door panel 204, and to temporarily join the outer panel part 201 and the inner panel part 202 to each other.

The inner panel part 202 is then returned to the true position of the outer panel part 201, the door glass 212 is rotated, and the corner piece 231 of the door glass 212 is fitted into the door glass run 228.

Finally, the outer panel part 201 and the inner panel part 202 are fastened together by bolts via the installation holes 225, 226.

The door glass 212 is installed on the inner door panel 207 in advance, the outer panel part 201 and the inner panel part 202 are temporarily joined together, and the corner piece 231 of the door glass 212 is then fitted into the door glass run 228. It is believed, however, that errors in mounting the door glass 212 in the inner door panel 207, as well as errors in mounting the door frame 205 to the outer door panel 204, bring about considerable displacement between the corner piece 231 and the door glass run 228, and make it difficult to fit these components together.

These mounting errors accumulate and enhance each other because of the sequential installation of the main guide 216 of the window regulator 211, the engagement protrusions 222 of the guide slider 215, the channel 223, the bracket, and the door glass 212 to the inner door panel 207.

Since a front end of the door glass 212 is guided by the door glass guide 214, the movement of the door glass 212 with respect to the inner door panel 207 is restricted, and the operation of fitting the corner piece 231 into the door glass run 228 becomes difficult.

In view of the above, a technique is needed for readily mounting a door glass in a run channel provided to a sash of a vehicle door.

DISCLOSURE OF THE INVENTION

According to an aspect of the present invention, there is provided a method for installing a door glass in a vehicle door, which method comprises the steps of: reducing a longitudinal length of the door glass by tilting the door glass, in a state being held by holding means, in a longitudinal direction of the vehicle at a position above a space defined by an inner panel and an outer panel of the vehicle door; positioning the door glass between a pair of sashes provided on front and rear parts of the vehicle door by lowering the tilted door glass; correcting the tilt of the door glass to a predetermined state and fitting in the door glass between the front and rear sashes; and lowering the door glass fitted between the front and rear sashes to a door glass installation position located proximately to a window regulator.

Thus, according to the method of the present invention, the door glass is tilted in the longitudinal direction of the vehicle, and the length of the door glass is reduced in the longitudinal direction. The tilted door glass is lowered and is positioned between the pair of sashes. The tilt of the door glass is corrected to a predetermined state, and the door glass is fitted into the front and rear sashes. Accordingly, the door glass can be readily fitted into run channels provided to the front and rear sashes, and the door glass can be lowered along the channels in this state. As a result, the door glass can be readily and quickly mounted in a vehicle door.

Preferably, the door glass is kept in a float-supported state via the holding means when the door glass is lowered to the door glass installation position.

Floating support of the door glass via the holding means thus allows, e.g., the door glass to more readily follow the shape of the run channels inside the sashes when the glass fitted in the front and rear sashes is lowered to a glass mounting position that is near the window regulator, and the door glass to be lowered easily and rapidly without the application of unnecessary force while the door glass is lowered. Accordingly, the door glass can be mounted in the vehicle door more easily, and vehicle doors can be produced with greater efficiency.

According to another aspect of the present invention, there is provided a device for installing a door glass in a vehicle door, which device comprises: holding means for holding the door glass; float-supporting/locking means for supporting the door glass in a floating state via the holding means and for releasing the door glass from the floating state and locking the door glass at a predetermined position; conveying means supporting the float-supporting/locking means to thereby convey the door glass from a predetermined position to the vehicle door; and control means for controlling the float-supporting/locking means to tilt the door glass, conveyed by the conveying means to the vehicle door for mounting in the vehicle door, in the vehicle longitudinal direction and to level the door glass so as.

The holding means is installed on the conveying means via the floating lock means, and the door glass is held by the holding means and is conveyed from a predetermined position to the vehicle door. The control device controls the process so that the door glass is tilted or leveled in the longitudinal direction of the vehicle in order to mount the door glass on the vehicle door; the door glass is then lowered into the sashes of the vehicle door, is supported in a floating state by the floating lock means, is lowered to a predetermined position, and is then locked from the floating state. Accordingly, the installation processes can be carried out quickly and accurately at a desired timing. Vehicle doors, and hence vehicles, can be produced with greater efficiency.

Furthermore, the installation device of the present invention can support the door glass in a floating state via the holding means, and is provided with floating lock means capable of floating and locking. The door glass supported in a floating state is therefore not restricted by components that constitute the vehicle door when the door glass is mounted on the vehicle door; unnecessary force is not applied to the door glass; and the door glass can be mounted with greater ease.

BRIEF DESCRIPTION OF THE DRAWINGS

FIG. 1 is a perspective view showing a door glass and an installation device according to the present invention;

BEST MODE FOR CARRYING OUT THE INVENTION

Figure 2:
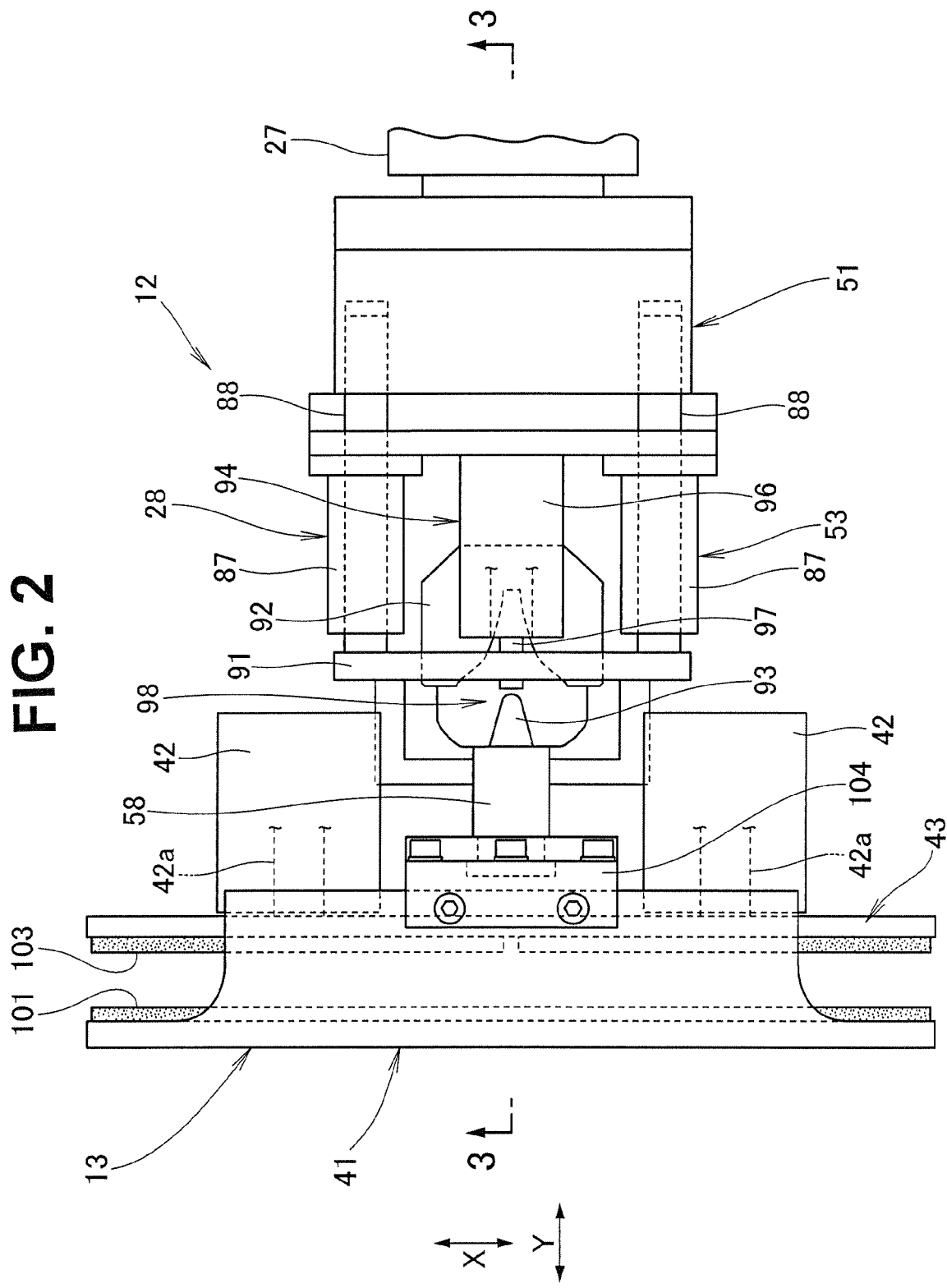
FIG. 2 is a top plan view showing a hand part of the door glass installation device shown in FIG. 1.

Certain preferred embodiments of the present invention are described in detail below, by way of example only, with reference to the accompanying drawings.

FIG. 1 shows a vehicle door glass installation device 10 that is provided with a floating lock device 28 according to the present invention.

The vehicle door glass installation device 10 (referred to below simply as "door glass installation device 10") is a robot for mounting a door glass 15 in a vehicle door 16.

The door glass installation device 10 has a conveying part 11, a hand part 12 that is installed on a distal end of the conveying part 11, and a door glass control device 110 (see FIG. 4) for controlling the driving of the conveying part 11 and the hand part 12. The door glass 15 is held by a holding part 13 that is provided to a distal end part of the hand part 12, and is mounted on the vehicle door 16.

The conveying part 11 has a first arm part 21 swingably and rotatably installed on a base portion (not shown), a first joint part 22 swingably installed on the first arm part 21, a second arm part 23 rotatably and swingably installed on the first joint part 22, and a second joint part 24 swingably installed on a distal end of the second arm part 23 and connected to the hand part 12. The base part, the first arm part 21, the second arm part 23, and the second joint part 24 are driven by a motor (not shown).

The hand part 12 has a force sensor 27 (see FIG. 2) installed on the second joint part 24 of the conveying part 11, a floating lock device 28 installed on the force sensor 27, and a holding part 13 that is installed on a distal end of the floating lock device 28 and that holds the door glass 15.

The force sensor 27 detects reaction force that is applied to the door glass 15. Specifically, the force sensor detects force in the axial direction of the mutually orthogonal X, Y, and Z axes, as well as torque around each of the X, Y, and Z axes. The X axis is a horizontal direction that lies substantially in the plane of the door glass 15, the Y axis is a direction that is substantially orthogonal to the plane of the door glass 15, and the Z axis is a vertical direction.

The floating lock device 28 provides a movable support (referred to below as "floating support") to the door glass 15 around a distal end part of the conveying part 11 via the holding part 13. The floating lock device 28 also brings about a fixed state (referred to below as "floating lock") for the door glass 15 to the conveying part 11 via the holding part 13. The structure and operation will be described in detail below.

The door glass 15 is plate glass that has a slight curve. Regulator attachments 31, 31 for installing the door glass 15 on the window regulator are disposed at a lower end part of the door glass 15.

The vehicle door 16 has an inner panel 33, an outer panel installed on the exterior of the inner panel 33, and a sash 35 installed on top parts of the inner panel 33 and the outer panel 34. The door glass 15 is inserted and mounted in a space 36 between the inner panel 33 and the outer panel 34.

FIG. 2 shows the hand part 12 shown in FIG. 1. The holding part 13 is installed on a distal end part of the floating lock device 28, and the floating lock device 28 is installed on the force sensor 27.

The holding part 13 has a fixed part 41 installed on the floating lock device 28, and a moving part 43 that is driven relative to the fixed part 41 by two cylinder devices 42, 42.

The door glass 15 shown in FIG. 1 is sandwiched and held between the fixed part 41 and the moving part 43.

Figure 3:
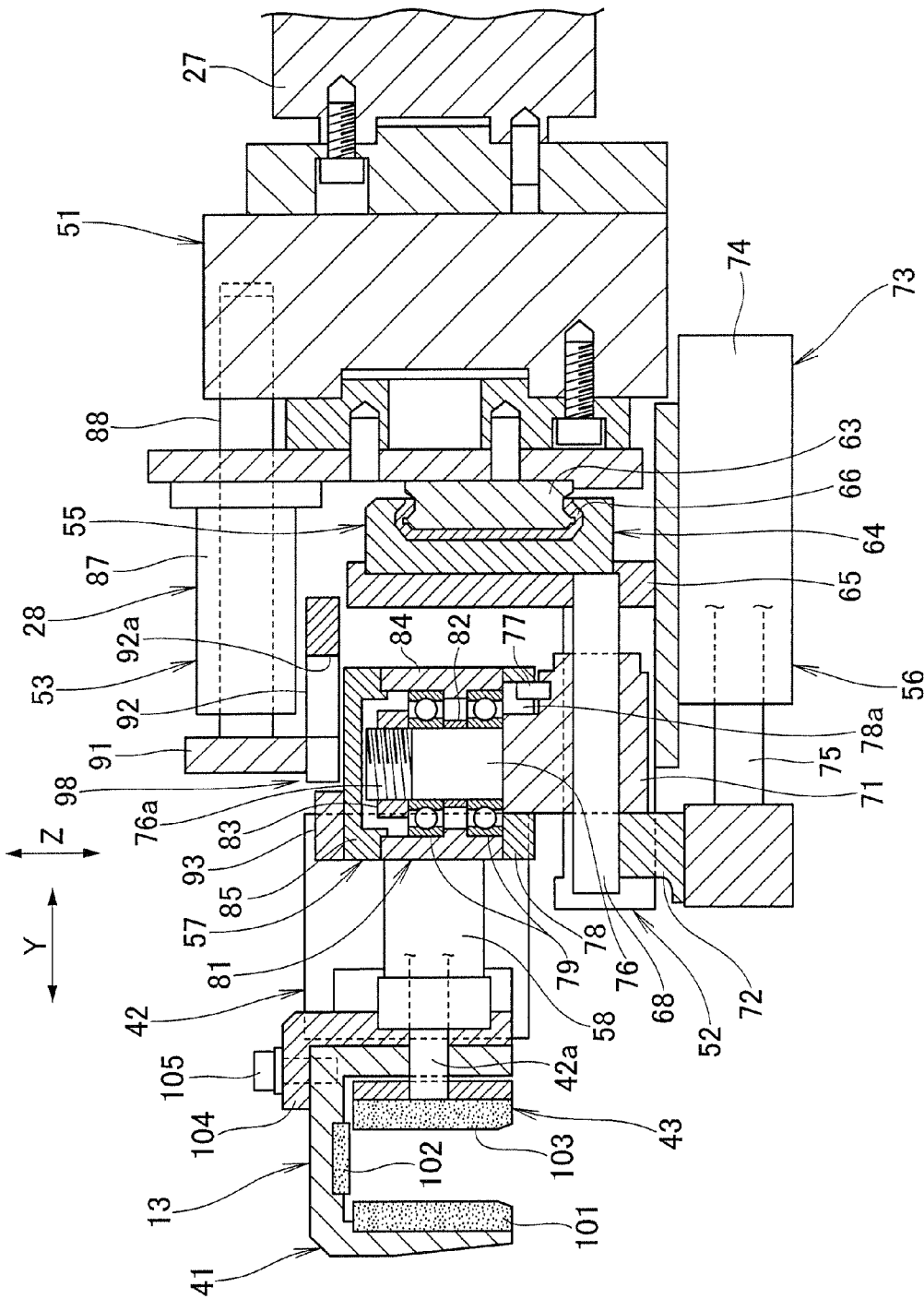
FIG. 3 is a sectional view taken along line 3-3 of FIG. 2.

As shown in FIG. 3, the floating lock device 28 has a base part 51 installed on the force sensor 27, a floating mechanism 52 installed on a lower portion of the base part 51, and a floating lock mechanism 53 installed on an upper part of the base part 51.

The floating mechanism 52 is provided with a horizontal sliding mechanism 55 installed on the base part 51, a vertical sliding mechanism 56 installed on a lower part of the horizontal sliding mechanism 55, a swing mechanism 57 installed on a top part of the vertical sliding mechanism 56, and a main rod 58 that connects the holding part 13 to the swing mechanism 57.

The horizontal sliding mechanism 55 moves the holding part 13 in a direction perpendicular to the plane (X-axis direction) of the Figure with respect to the base part 51. The horizontal sliding mechanism 55 has a rail 63 provided to the base part 51, a slider part 64 slidably fitted on the rail 63, and a support member 65 that is installed on the slider part 64 and that supports the vertical sliding mechanism 56. A sliding member 66 is provided to the slider 64 so as to allow the slider to move stably and smoothly on the rail 63.

The vertical sliding mechanism 56 slides the components of the holding part 13 in the Y-axis direction. The vertical sliding mechanism 56 has a guide support column 68 installed on the support member 65, a slider guide 71 slidably fitted to the guide support column 68, and a cylinder device 73 for driving the slider guide 71 via a connecting member 72. The reference numbers 74, 75 indicate a cylinder and a rod that constitute the cylinder device 73.

The swing mechanism 57 swings the holding part 13 in a direction perpendicular to the plane the Figure. The swing mechanism 57 has a pivot shaft 76 provided to the slider guide 71, and a bearing part 81 rotatably installed on the pivot shaft 76 via bearings 79, 79. A collar 82 is provided between the bearings 79, 79. A nut 83 is threaded onto a male screw part 76a of the pivot shaft 76 in order to prevent the bearings 79, 79 from coming off the pivot shaft 76.

The bearing part 81 has a body part 84 into which the bearings 79, 79 are fitted, a lower support member 78 installed on a lower part of the body part 84, and a cap 85 for covering an opening of the body part 84. The main rod 58 is connected to the body part 84.

A notch 78a is formed in the lower support member 78, and a pin 77 embedded in the slider guide 71 is disposed in the notch 78a, whereby the rotation angle of the lower support member 78 is determined by the circumferential space between the pin 77 and the notch 78a. The rotation amount of bearing part 81 with the respect to the slider guide 71 is therefore restricted. A slot that extends along the circumferential direction may be formed instead of the notch 78a in the lower support member 78.

The floating lock mechanism 53 has slider guides 87, 87 (see FIG. 2) installed on the base part 51; slider support columns 88, 88 (see FIG. 2) slidably inserted in the slider guides 87, 87; a cross bar 91 installed on the distal ends of the slider support columns 88, 88; a cam plate 92 installed on a lower part of the cross bar 91; a locking cam 93 installed on the cap 85 in order to release and lock the floating state provided by the floating mechanism 52 by fitting into a cam groove 92a formed in the cam plate 92; and a cylinder device 94 (see FIG. 2) installed on the cross bar 91 in order to move the cam plate 92 along the Y-axis direction.

As shown in FIG. 2, the cylinder device 94 has a cylinder 96 and a rod 97.

The cam plate 92 and the locking cam 93 constitute a cam mechanism 98.

The holding part 13 is provided with the fixed part 41, which has a U-shaped cross-section; and the moving part 43, which is installed on distal ends of rods 42a of the cylinder devices 42. The fixed part 41 has first and second rubber pads 101, 102. The moving part 43 has a third rubber pad 103. The fixed part 41 is installed on the main rod 58 by a fitting 104, and is installed on the fitting 104 by a bolt 105.

Figure 4:
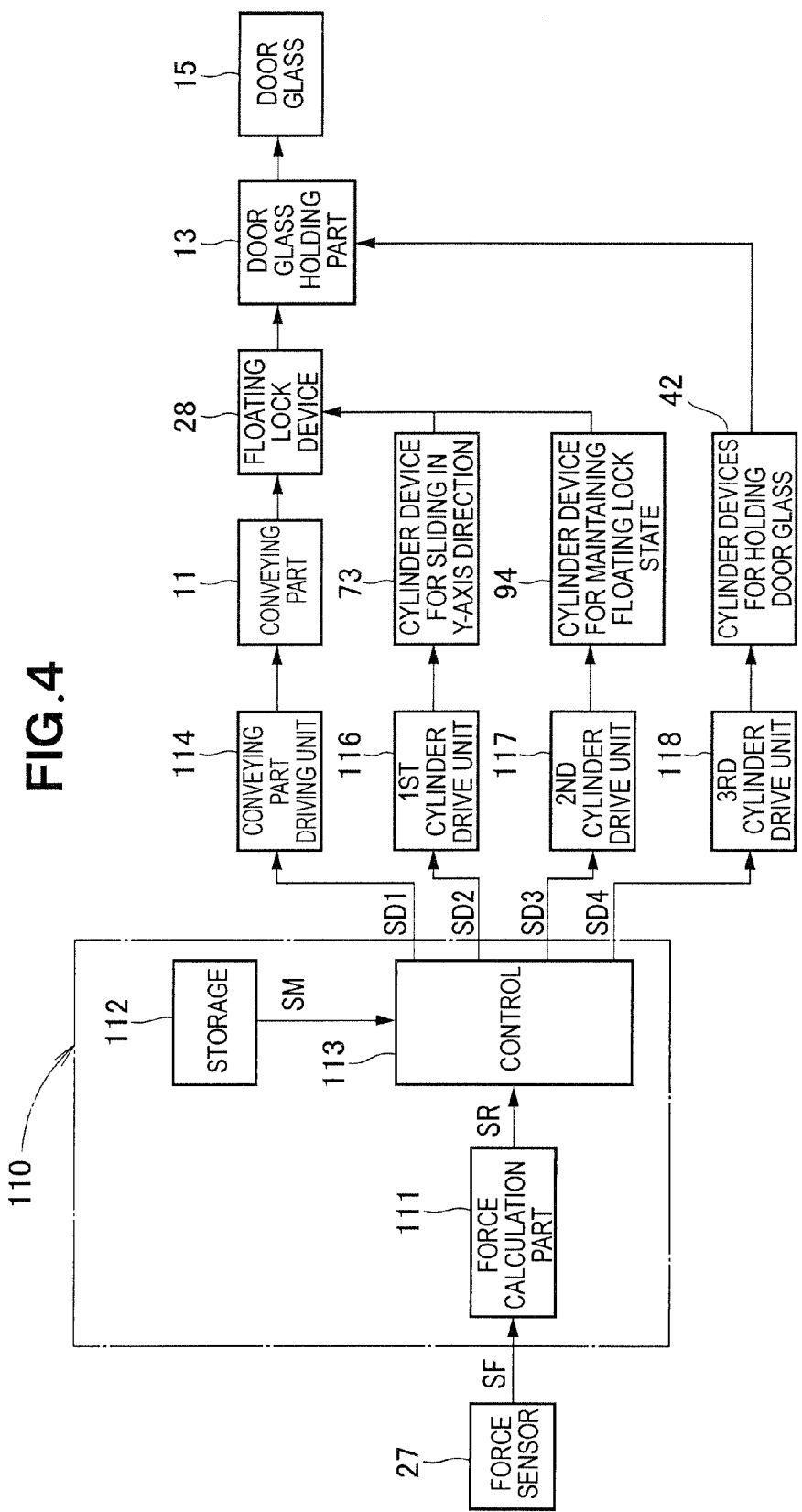
FIG. 4 is a block diagram illustrating an electrical functional of a door glass control device according to the present invention.

FIG. 4 shows an electrical functional block diagram of the door glass control device 110.

The door glass control device 110 shown in FIG. 4 has a force calculating part 111 whereby the reaction force applied to the door glass is calculated based on a force signal SF outputted from the force sensor 27, a storage part 112 for storing a conveying route of the door glass 15, and a controller 113.

The controller 113 generates a first drive signal SD1 based on a reaction force signal SR outputted from the force calculating part 111, and also generates a second drive signal SD2, third drive signal SD3, and fourth drive signal SD4 based on a storage signal SM from the storage part 112.

A conveying part drive unit 114 drives the conveying part 11 on the basis of the first drive signal SD1.

Based on the second drive signal SD2, a first cylinder drive unit 116 drives the cylinder device 73 for sliding in the Y-axis direction.

Based on the third drive signal SD3, a second cylinder drive unit 117 drives the cylinder device 94 for maintaining a floating lock state.

Based on the fourth drive signal SD4, a third cylinder drive unit 118 drives the cylinder devices 42 for holding the door glass.

Specifically, the controller 113 performs the following control procedure.

(1) Conveyance of the door glass 15 by the conveying part 11 is controlled so as to follow the conveying route of the door glass 15 that is stored in the storage part 112, the tilting and leveling of the door glass 15 is controlled as described in detail below, and correction of the orientation of the door glass 15 during conveying is controlled based on the reaction force from the force sensor 27.

(2) The driving of the cylinder device 73 for sliding in the Y-axis direction is controlled, and control is carried out so as to move the holding part 13 along the Y-axis direction via the floating lock device 28.

(3) The driving of the cylinder device 94 for maintaining a float lock state is controlled so that the door glass 15 is kept in a state of floating support or released from the state of floating support (i.e., locked from the floating state) by the floating lock device 28.

(4) The driving of the cylinder devices 42 for holding the door glass is controlled so that the door glass 15 disposed at the conveying starting position is grasped and held, and so that the door glass 15 is released at the conveying end position.

The operation of the floating lock device 28 will be described below.

Figure 5:
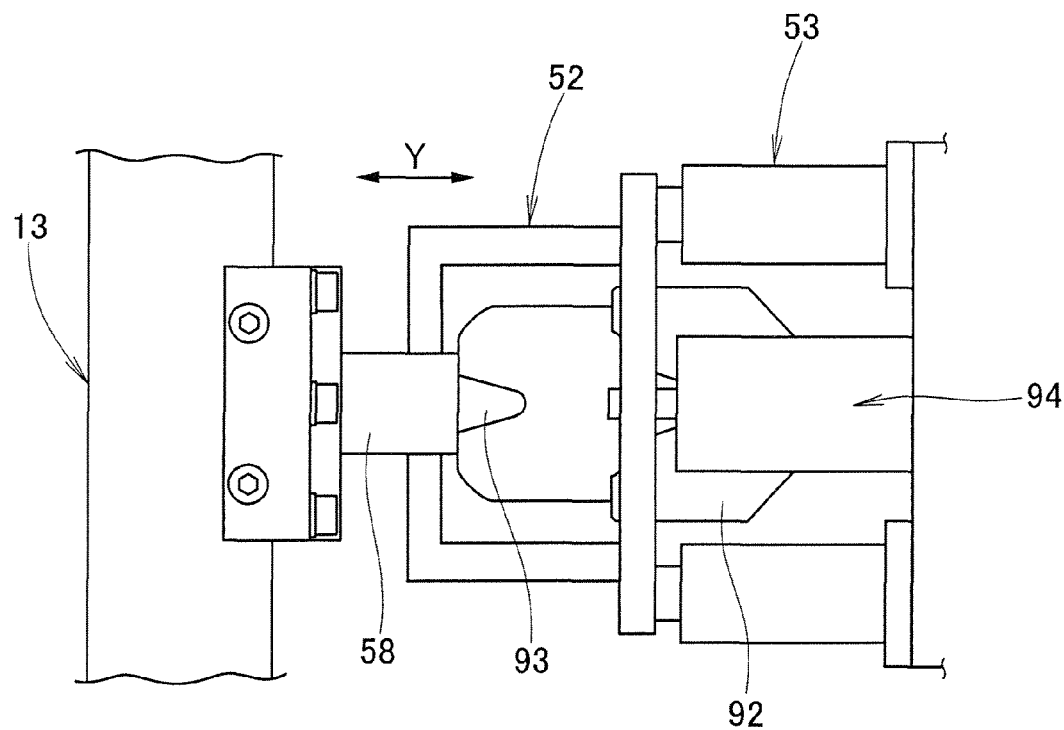
FIG. 5 is a view showing a state in which a floating mechanism moves along a Y-axis direction and in which a holding part for holding the door glass is supported in a floating state in the Y-axis direction.

FIG. 5 shows a state of floating support in the Y-axis direction.

The floating mechanism 52 can be moved (slid to the left in the Figure) along the arrowed Y-axis direction by the vertical sliding mechanism 56 (see FIG. 3). If the door glass 15 is subjected to external force, the door glass 15 will be moved along the Y-axis direction via the holding part 13, and the door glass 15 will be kept in a state of floating support in the Y-axis direction.

Figure 6:
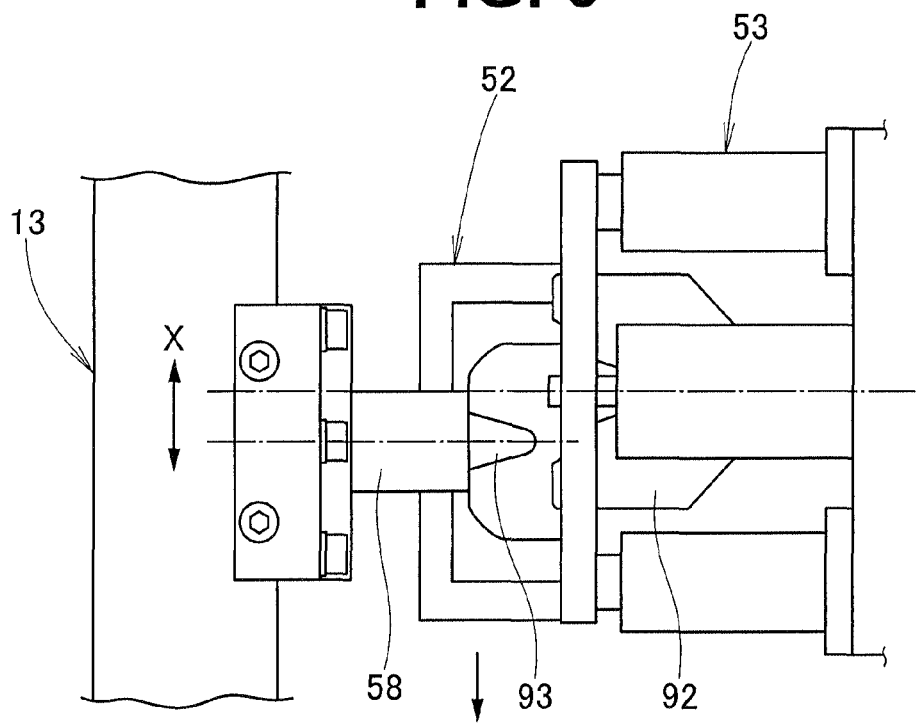
FIG. 6 is a view showing a state in which the floating mechanism moves along an X-axis direction and in which the holding part for holding the door glass is supported in a floating state in the X-axis direction.

FIG. 6 shows a state of floating support in the X-axis direction.

The floating mechanism 52 can be moved along the arrowed X-axis direction (slid downward in the Figures) by the horizontal sliding mechanism 55 (see FIG. 3). If the door glass 15 is subjected to external force, the door glass 15 will be moved along the X-axis direction via the holding part 13, and the door glass 15 will be kept in a state of floating support in the X-axis direction.

Figure 7:
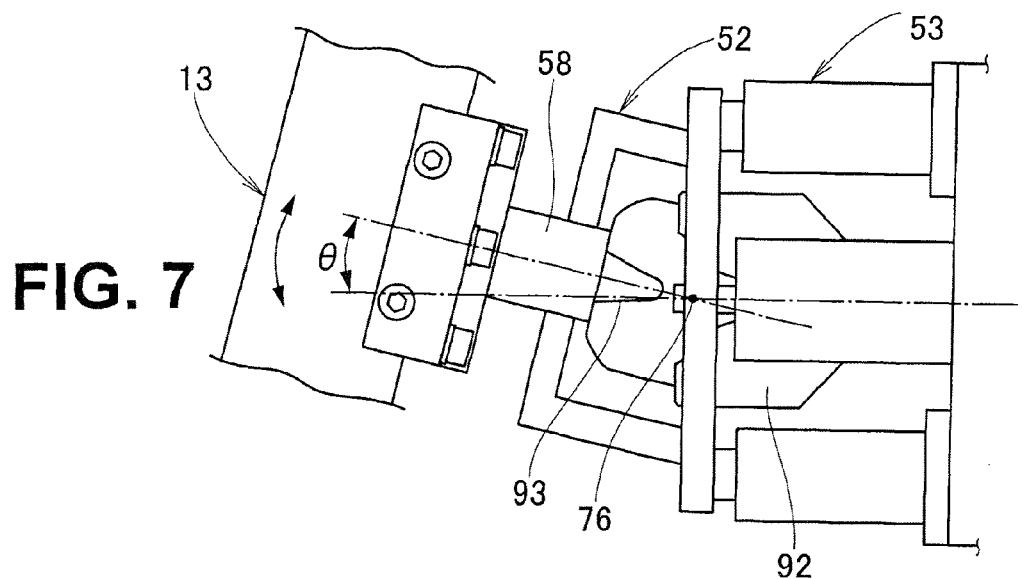
FIG. 7 is a view showing a state in which the holding part for holding the door glass is supported in a floating state about a pivot shaft.

FIG. 7 shows a state of floating support about the pivot shaft.

The floating mechanism 52 can be caused to swing (in the clockwise direction in the Figure) about the pivot shaft 76 (indicated by a point 76) by the swing mechanism 57 (see FIG. 3). If the door glass 15 is subjected to external force, the door glass 15 will be caused to swing about the pivot shaft 76 via the holding part 13 (θ is the swing angle), and the door glass 15 will be kept in a state of floating support about the pivot shaft 76.

Figure 8A:
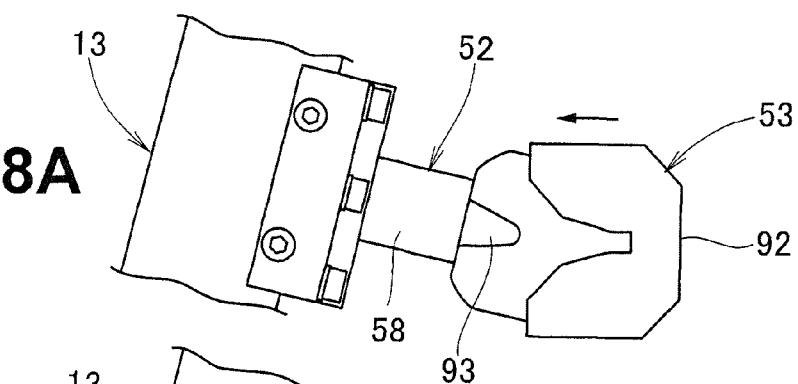
FIGS. 8A through 8C are views showing a state in which the holding part is placed in a locked state from a condition of being supported in a floating state about the pivot shaft.
Figure 8B:
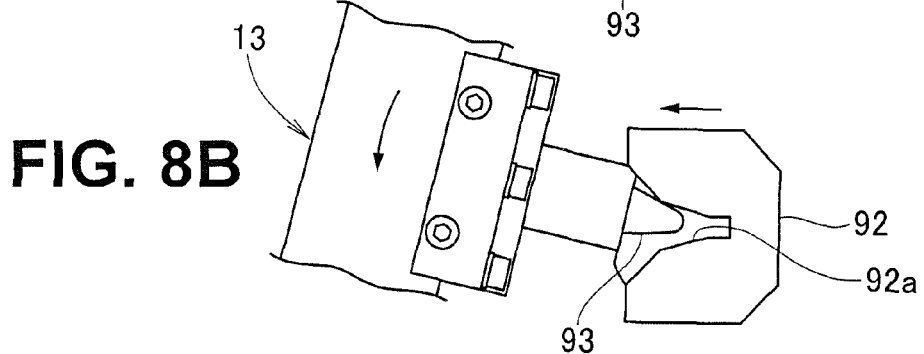
Figure 8C:
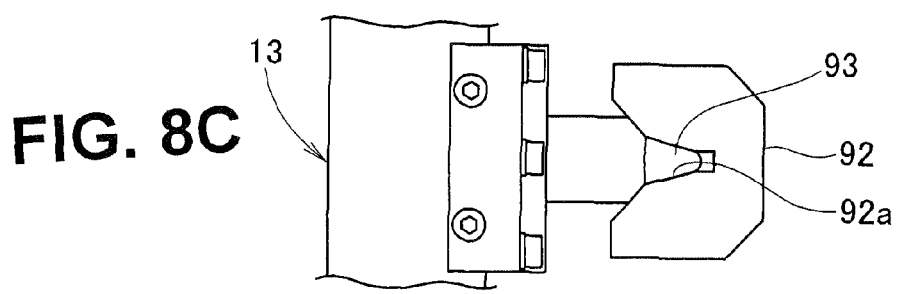

FIGS. 8A through 8C show a case in which the state of floating support about the pivot shaft 76 shown in FIG. 7 is released.

As shown in FIG. 8A, the cam plate 92 of the floating lock mechanism 53 is moved in the direction of the arrow in a state in which the holding part 13 is caused to swing about the pivot shaft 76 by the swing mechanism 57 (see FIG. 3).

As shown in FIG. 8B, the locking cam 93 moves along an inner surface of the cam groove 92a of the cam plate 92 when the cam plate 92 comes into contact with the locking cam 93. Therefore, the holding part 13 swings about the pivot shaft 76 as shown by the arrow, and the swing angle θ is gradually reduced.

Finally, as shown in FIG. 8C, the locking cam 93 is completely fitted into the cam groove 92a, and the holding part 13 is returned to a predetermined position and fixed in place in this position. Specifically, a state of floating support is achieved.

The float lock can also be carried out from a state of floating support in the X-axis direction shown in FIG. 6. In the state of floating support in the Y-axis direction shown in FIG. 5, the vertical sliding mechanism 56 (see FIG. 3) is operated, the holding part 13 is returned to the initial position, and the floating lock mechanism 53 is then operated to achieve a state of floating lock.

Therefore, the holding part 13 can be rapidly brought to a state of floating lock at a predetermined position by the floating lock mechanism 53 even in a state of combined floating support in the Y-axis direction, in the X-axis direction, and around the pivot shaft.

A method for installing the door glass 15 in the vehicle door 16 will be described below on the basis of FIGS. 9A through 9E.

Figure 9A:
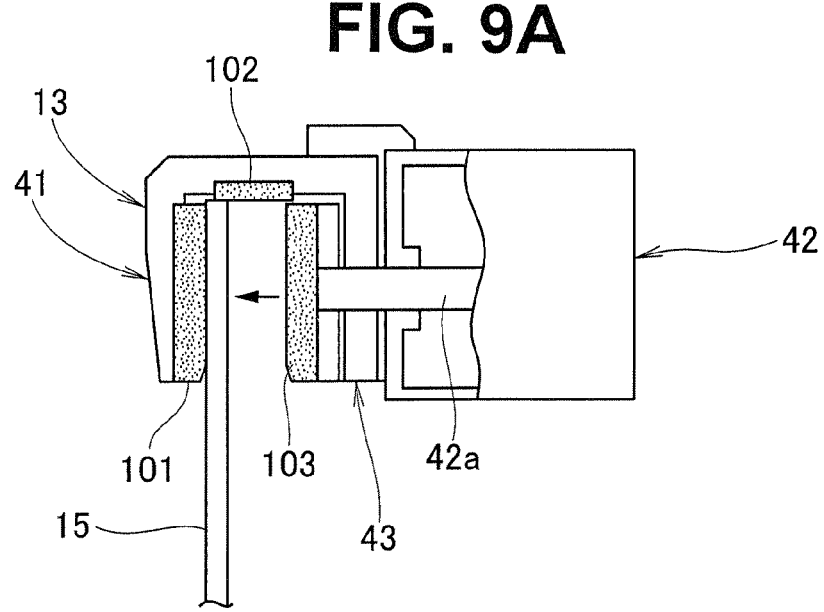
FIGS. 9A through 9E are views illustrating a manner of mounting of the door glass in the vehicle door.
Figure 9B:
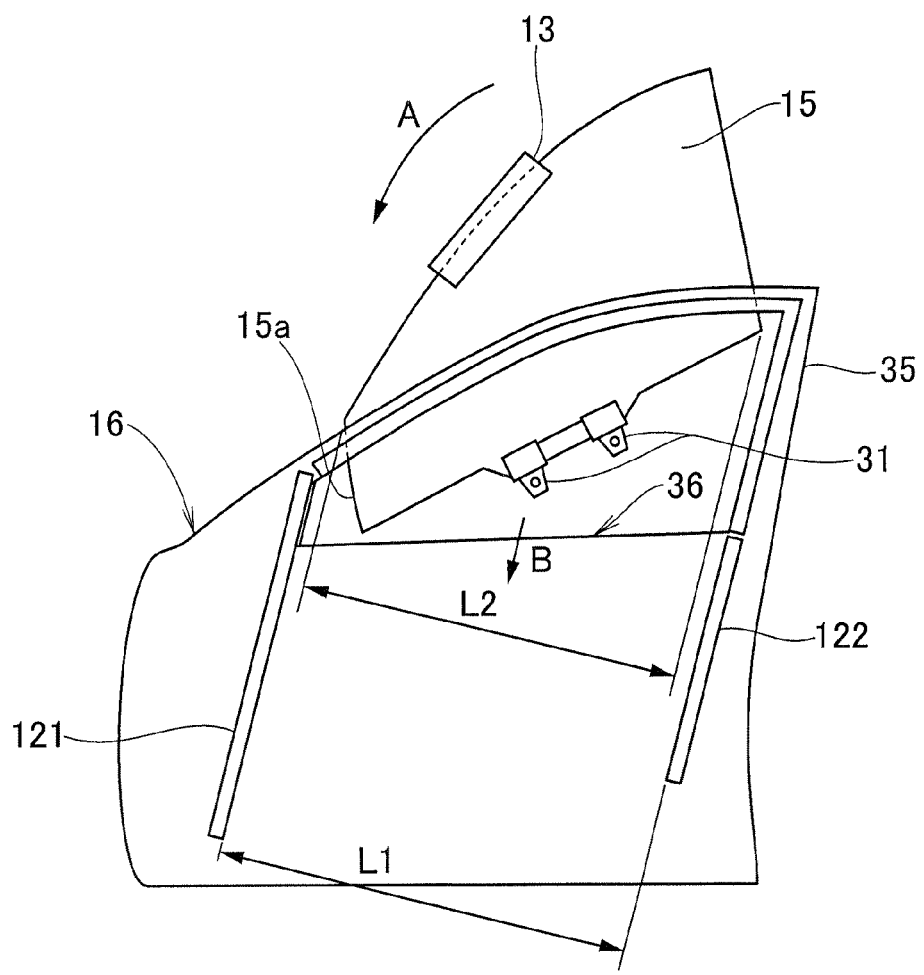

As shown in FIG. 9A, first, an upper edge part of the door glass 15, which is positioned at a glass supply position, is brought into contact with the first pad 101 and the second pad 102. The moving part 43 of the holding part 13 is then driven by the cylinder devices 42, and the door glass 15 is sandwiched by the first pad 101 and the third pad 103.

At this time, the door glass 15 is kept in a state of floating lock. While the reaction force applied to the door glass 15 is detected by the force sensor 27 (see FIG. 4), the door glass control device 110 controls the driving of the conveying part 11 as needed on the basis of the reaction force, and the orientation of the holding part 13 with respect to the door glass 15 is corrected.

While being held upright, the door glass 15 is subsequently tilted in the longitudinal direction of the vehicle door 16, i.e., so that the front edge 15a of the door glass 15 is tilted forward and downward as shown by the arrow A, and is moved to a position above the space 36 between the inner panel 33 (see FIG. 1) and the outer panel 34 of the vehicle door 16.

Reference numerals 121, 122 designate a front lower sash and a rear lower sash, respectively, provided inside the automotive vehicle door 16 in order to guide the front and rear of the door glass 15. A space L2 between the front and rear of the tilted door glass 15 is less than a space L1 between the front lower sash 121 and the rear lower sash 122. Therefore, the door glass 15 can be lowered between the front lower sash 121 and the rear lower sash 122 from the space 36, as shown by the arrow B.

Figure 9C:
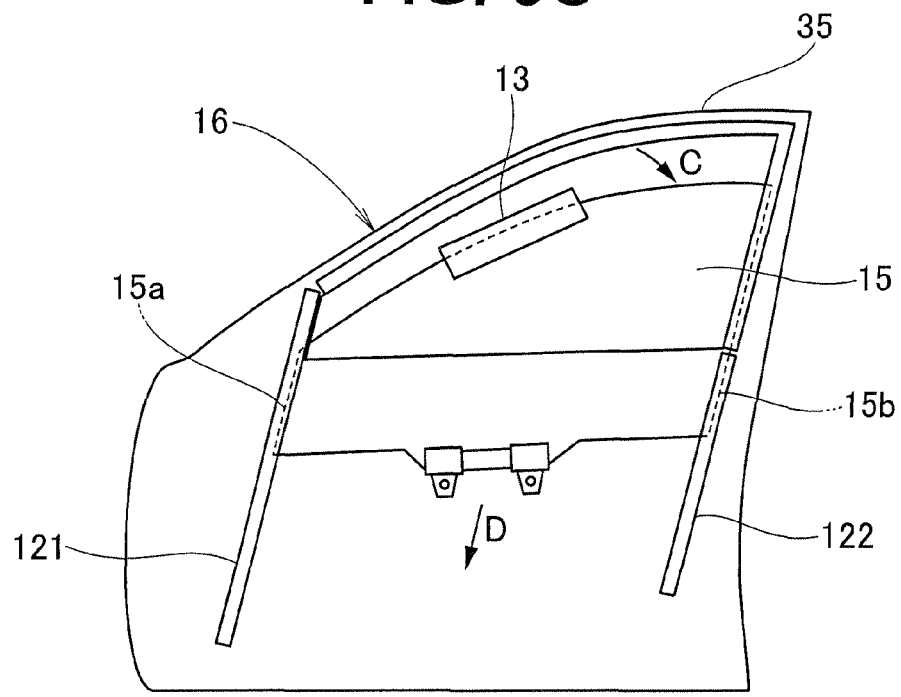

As shown in FIG. 9C, the door glass 15 is rotated in the direction shown by the arrow C (the direction opposite of the direction in which the door glass 15 is tilted), the tilted state of the door glass 15 is corrected to the initial horizontal state, and the front edge 15a and rear edge 15b of the door glass 15 are fitted into rubber run channels (not shown) mounted inside the front lower sash 121 and the rear lower sash 122. When excessive reaction force is detected by the force sensor during correction of the tilted state of the door glass 15, the conveying part 11 (FIG. 4) is controlled by the door glass control device 110 so that the reaction force decreases to a predetermined value.

The door glass 15 is then brought to a state of floating support, and is lowered along the run channels of the front lower sash 121 and the rear lower sash 122, as shown by the arrow D.

Figure 9D:
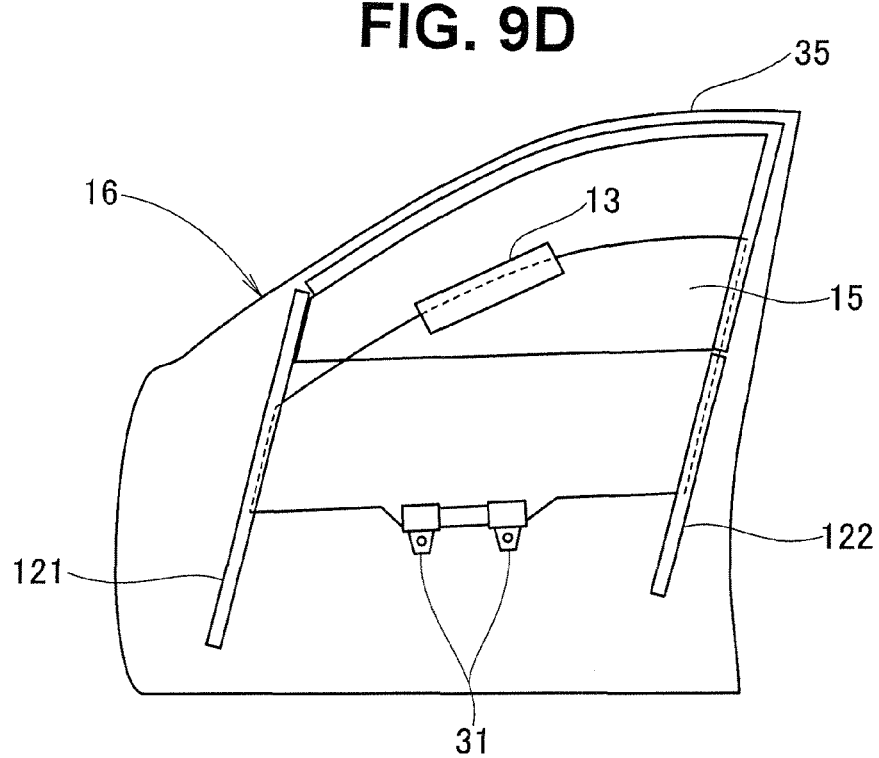

FIG. 9D shows a state in which the door glass 15 is lowered to a predetermined position from the state in FIG. 9C while being kept in a state of floating support.

In the present invention, the door glass 15 is kept in a state of floating support when lowered from the state shown in FIG. 9C to the state shown in FIG. 9D, whereby the door glass 15 can be smoothly lowered along the run channels without the application of unnecessary force to the door glass 15 while allowing for variations in the dimensional and assembly accuracy of the front lower sash 121, the rear lower sash 122, and the run channels.

Figure 9E:
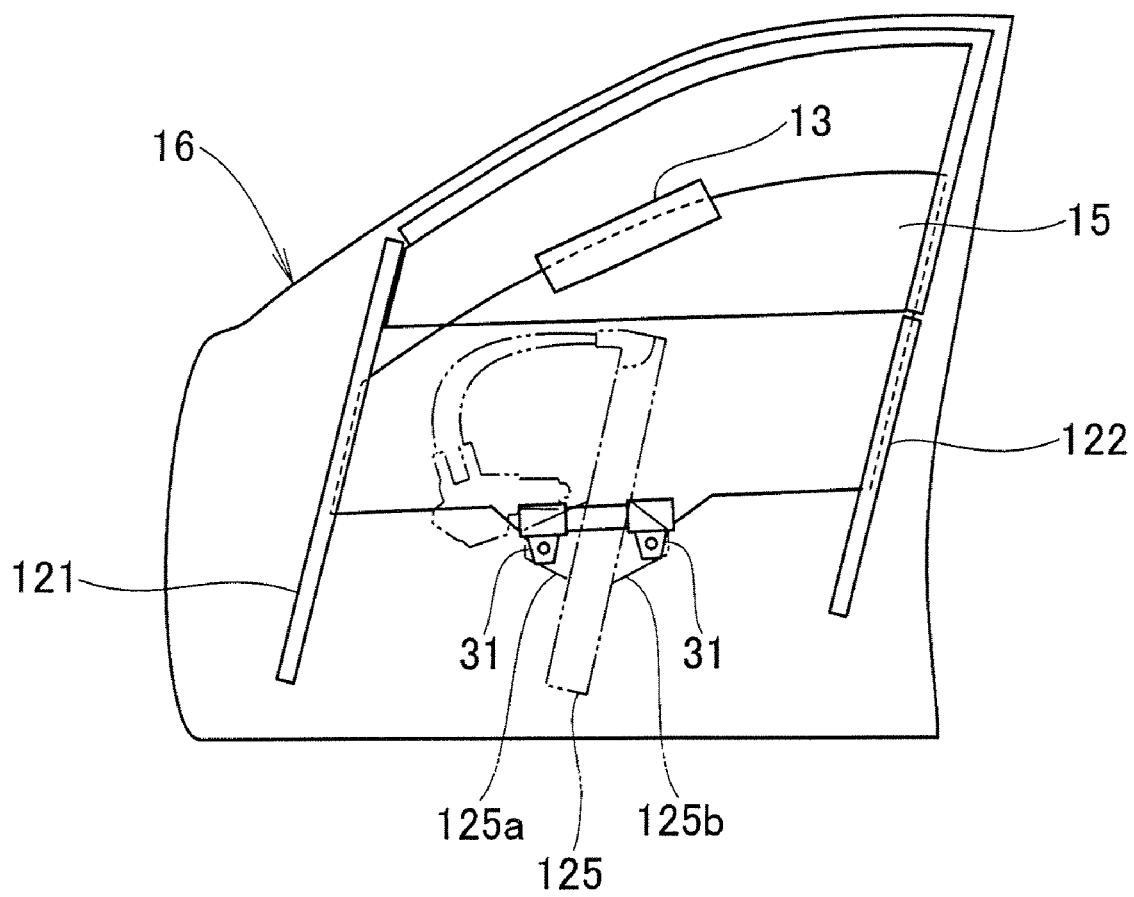

Finally, as shown in FIG. 9E, the regulator attachments 31, 31 of the door glass 15 are installed on the door glass attachments 125a, 125b of the window regulator 125 in the state shown in FIG. 9D.

Figure 10:
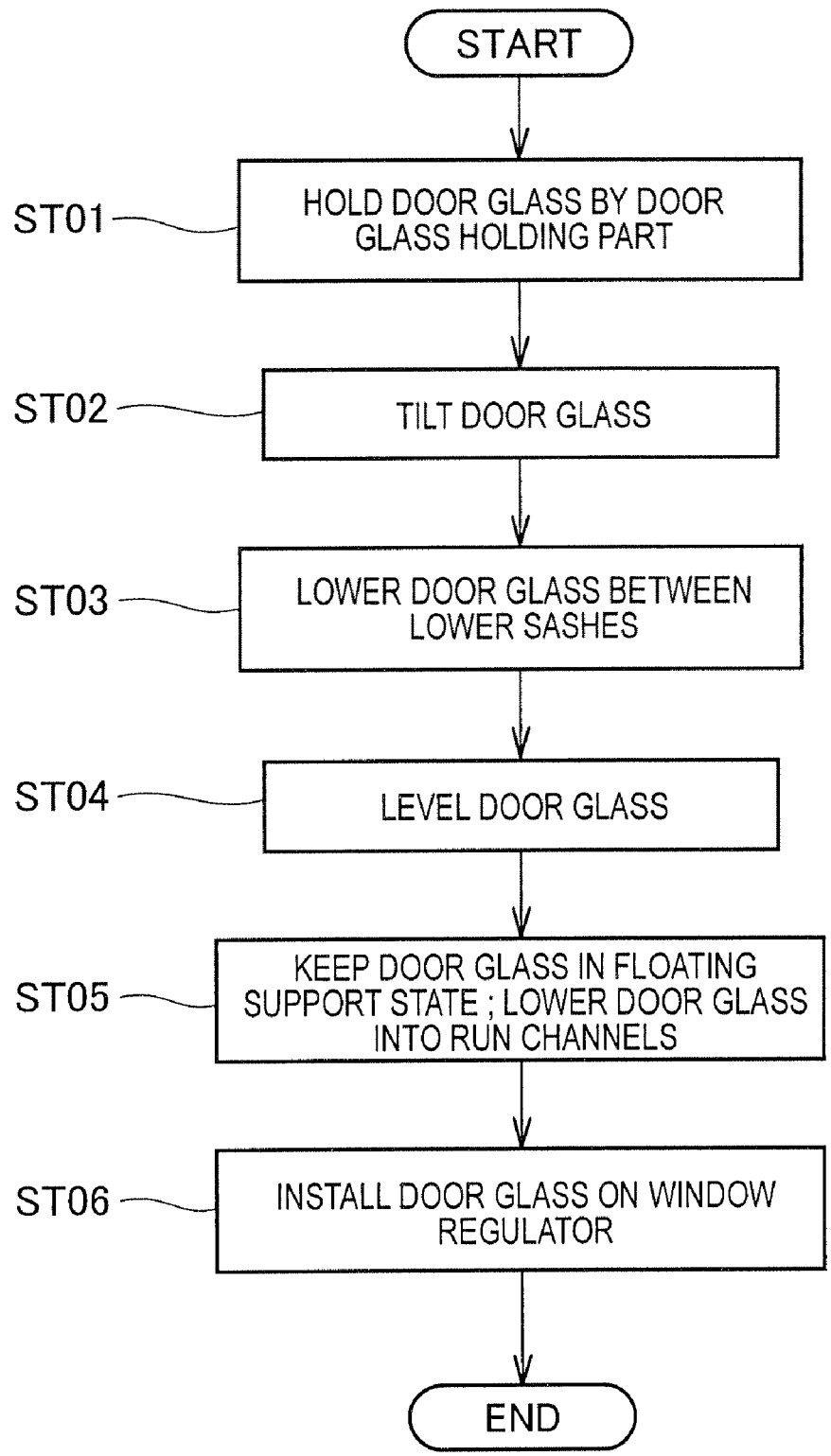
FIG. 10 is a flowchart showing a sequence in which the door glass is mounted on the vehicle door of FIGS. 9A through E.
Figure 11:
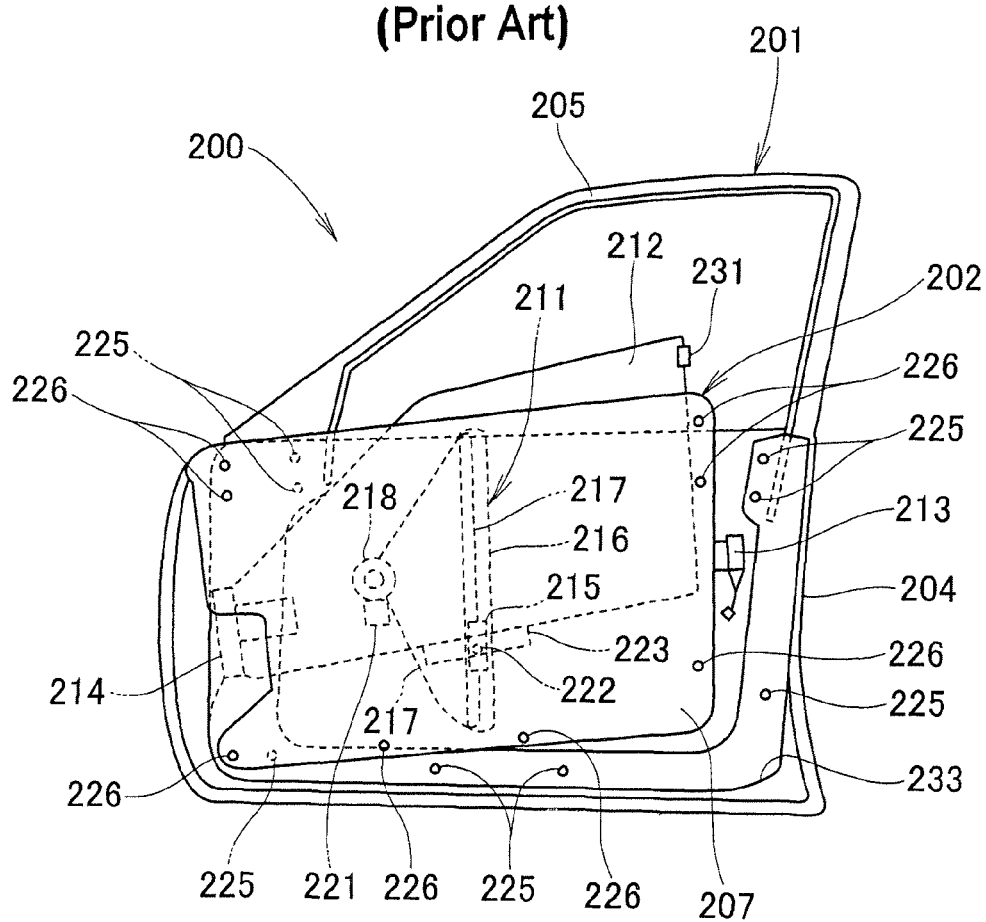
FIG. 11 is a view showing a state in which a door glass is mounted in a conventional vehicle door.
Figure 12:
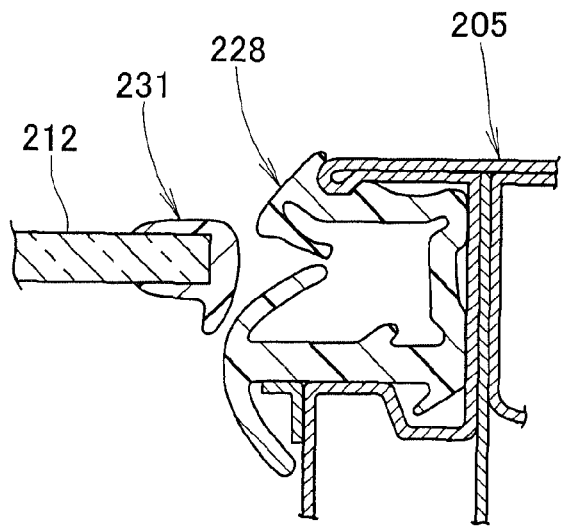
FIG. 12 is a sectional view of a door frame and the door glass of FIG. 11.

FIG. 10 is a flowchart of the method for installing the door glass illustrated in FIGS. 9A through 9E.

Step (abbreviated below as ST) 01: The door glass 15, which is positioned in the door glass supply position, is held by the holding part 13.

ST02: The door glass 15 is tilted in the longitudinal direction of the vehicle door 16 in an upright state, and is moved to a position above the space 36 between the inner panel 33 and outer panel 34 of the vehicle door 16.

ST03: The door glass 15 is lowered, inserted into the space 36 between the inner panel 33 and the outer panel 34, and positioned between the front lower sash 121 and the rear lower sash 122.

ST04: The door glass 15 is leveled to the initial state and fitted inside the run channels mounted on the front lower sash 121 and rear lower sash 122.

ST05: The door glass 15 is lowered to a predetermined position inside the run channels in a state of floating support.

ST06: The door glass 15 is installed on the window regulator 125.

Installation of the door glass 15 in the vehicle door 16 is thereby completed.

Thus, according to the method for installing a door glass according to the present invention, the door glass 15 is tilted in the longitudinal direction of the vehicle and then lowered, and is positioned between the front lower sash 121 and the rear lower sash 122 (which constitute a pair). The tilted state of the door glass 15 is then corrected to a predetermined state, whereby the door glass 15 is fitted in the front lower sash 121 and the rear lower sash 122. Therefore, the door glass 15 can be readily fitted into the run channels provided to the front lower sash 121 and the rear lower sash 122, and can be lowered along the run channels in this state. The door glass 15 can therefore be readily and rapidly mounted.

When the door glass 15 is lowered along the front lower sash 121 and the rear lower sash 122, the door glass 15 is kept in a state of floating support via the holding part 13. Therefore, the door glass 15 can be even more readily lowered along the shape of the run channels provided to the front lower sash 121 and the rear lower sash 122, and the door glass 15 can be readily and rapidly lowered without the application of unnecessary force to the door glass 15. Accordingly, the door glass 15 can be mounted on the vehicle door 16 more easily, and the vehicle door 16 can be produced with greater efficiency.

The door glass attachment device 10 of the present invention is provided with the floating lock device 28, which can keep the door glass 15 in a state of floating support and a state of floating lock via the holding part 13, as shown in FIGS. 1, 3, and 4. Therefore, the door glass 15 supported in the floating state can be readily lowered along the run channels in the sashes without being restricted by the components of the vehicle door when mounted on the vehicle door 16. The door glass 15 can therefore be mounted more easily without the application of unnecessary force to the door glass 15.

The door glass control device 110 controls the tilting or leveling of the door glass 15 in the longitudinal direction of the vehicle in order to mount the door glass 15 in the vehicle door 16, and controls the floating support or the floating lock of the door glass 15 by the floating lock device 28. The presence of the door glass control device 110 allows the tilting and leveling of the door glass 15, as well as the floating support or the floating lock of the door glass 15, to be rapidly and accurately carried out at a desired timing. Therefore, the vehicle door 16, and hence the automotive vehicle, can be produced with greater efficiency.

In FIG. 1, a state approaching that of floating support can be maintained by adopting an arrangement in which driving of the conveying part 11 is controlled by the door glass control device 110 in accordance with the reaction force detected by the force sensor 27 shown in FIG. 4 for the floating support of the holding part 13 in the Z-axis direction and around the X and Y axes.

INDUSTRIAL APPLICABILITY

In accordance with the present invention, a door glass can be readily mounted in a vehicle door. The invention is thus useful in the field of automotive production.

What is claimed is:

1. A method for installing a door glass in a vehicle door, comprising the steps of:
    floatingly supporting the door glass;
    reducing a longitudinal length of the door glass by tilting the door glass in a longitudinal direction of the vehicle at a position above a space defined by an inner panel and an outer panel of the vehicle door;
    guiding and positioning the door glass between a pair of sashes provided on front and rear parts of the vehicle door by lowering the tilted door glass;
    correcting the tilt of the door glass to a predetermined state and fitting in the door glass between the front and rear sashes by feedback from at least one sensor; and
    lowering the door glass fitted between the front and rear sashes to a door glass installation position located proximately to a window regulator; and
    releasing the floatingly supporting.

2. A device for installing a door glass in a vehicle door, comprising:
    means for holding the door glass;
    means associated with the means for holding for floatingly supporting the door glass in a floating state and for releasing the door glass from the floating state and locking the door glass at a predetermined position;
    means supporting the means for floatingly supporting and for releasing for conveying the door glass from a predetermined position to the vehicle door; and
    control means for controlling the means for floatingly supporting and for releasing to tilt the door glass, conveyed by the means for conveying to the vehicle door for mounting in the vehicle door, in the vehicle longitudinal direction, to guide and position the door glass between a pair of sashes provided on front and rear parts of the vehicle door, to correct the tilt of the door glass to a predetermined state and fitting in the door glass between the front and rear sashes by feedback from at least one sensor; to lower the door glass fitted between the front and rear sashes to a door glass installation position located proximately to a window regulator, and to level the door glass in the vehicle door so that the door glass may be secured to the window regulator.

* * * * *